(12) United States Patent
McLean et al.

(10) Patent No.: US 8,449,757 B2
(45) Date of Patent: May 28, 2013

(54) COMBINED CHEMISTRY HYDROGEN GENERATION SYSTEM

(75) Inventors: Gerard F McLean, West Vancouver (CA); Joerg Zimmermann, Vancouver (CA)

(73) Assignee: Societe BIC, Clichy (FR)

( * ) Notice: Subject to any disclaimer, the term of this patent is extended or adjusted under 35 U.S.C. 154(b) by 868 days.

(21) Appl. No.: 12/348,729

(22) Filed: Jan. 5, 2009

(65) Prior Publication Data

US 2009/0173620 A1 Jul. 9, 2009

Related U.S. Application Data

(60) Provisional application No. 61/019,182, filed on Jan. 4, 2008.

(51) Int. Cl.
*C25B 1/02* (2006.01)
*C25B 9/00* (2006.01)
*C01B 3/02* (2006.01)

(52) U.S. Cl.
USPC ................. 205/637; 204/248; 423/648.1

(58) Field of Classification Search
USPC ................. 422/186.04; 205/628–639
See application file for complete search history.

(56) References Cited

U.S. PATENT DOCUMENTS

| | | | | |
|---|---|---|---|---|
| 3,892,653 | A * | 7/1975 | Pacheco | 204/238 |
| 4,211,537 | A * | 7/1980 | Teitel | 48/191 |
| 4,288,301 | A * | 9/1981 | Hart | 205/555 |
| 4,436,793 | A | 3/1984 | Adlhart | |
| 6,182,717 | B1 * | 2/2001 | Yamashita | 141/82 |
| 6,610,193 | B2 * | 8/2003 | Schmitman | 205/628 |
| 6,989,210 | B2 | 1/2006 | Gore | |
| 7,951,349 | B2 * | 5/2011 | Kindler et al. | 423/416 |
| 2003/0162059 | A1 * | 8/2003 | Gelsey | 429/17 |
| 2006/0117659 | A1 * | 6/2006 | McLean | 48/61 |
| 2007/0039815 | A1 * | 2/2007 | Bartel | 204/242 |
| 2007/0084879 | A1 | 4/2007 | McLean et al. | |
| 2008/0143098 | A1 | 6/2008 | Zimmermann | |
| 2008/0311458 | A1 | 12/2008 | Schrooten et al. | |

* cited by examiner

*Primary Examiner* — Nicholas A Smith
*Assistant Examiner* — Brian W Cohen
(74) *Attorney, Agent, or Firm* — Schwegman Lundberg & Woessner, P.A.

(57) ABSTRACT

Embodiments of the invention relate to an apparatus or hydrogen generating system including a galvanic or first hydrogen generator and a thermally-activated or second hydrogen generator connectable to one another.

22 Claims, 4 Drawing Sheets

COMBINED CHEMISTRY HYDROGEN GENERATION SYSTEM

PRIORITY OF INVENTION

This application claims the benefit of priority to U.S. Provisional Patent Application Ser. No. 61/019,182, filed Jan. 4, 2008 respectively, which is herein incorporated by reference.

BACKGROUND

Hydrogen can be produced from galvanic coupling of dissimilar metals. When a galvanic cell is created, a current flows between the anode and cathode metals. In addition to the current being produced, hydrogen is also generated. Although such reactions are very controllable, there are several drawbacks to using such galvanic hydrogen generators in small or micro electronic devices. The quantity of hydrogen produced is relatively low, as well as the ability of the current generated to do useful work. If not utilized, the current must be dissipated and is commonly channeled through resistive loads to prevent an unsafe short circuit.

An alternative form of hydrogen generation consists of materials that release hydrogen upon heating. These materials are generally stable at ambient temperatures and have a relatively high hydrogen content, but the heat of reaction to release the hydrogen can be difficult to control. Further, an auxiliary heat source may be required which increases the volume, weight and complexity of the device in which it is being utilized.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
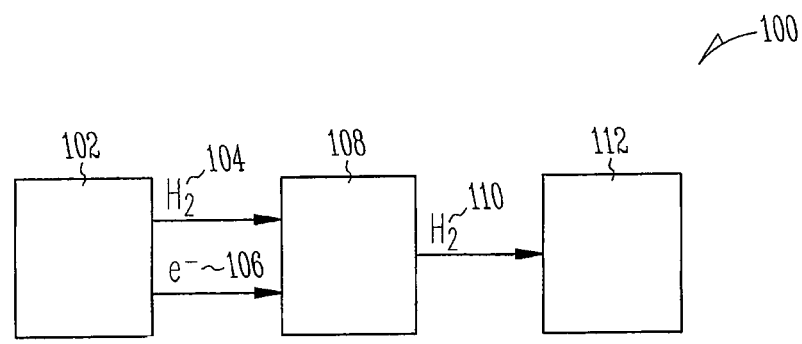
FIG. 1 illustrates a schematic view of a hybrid hydrogen generation system utilizing a galvanic reaction, according to some embodiments.

Embodiments of the invention relate to a hydrogen generating system including a first hydrogen generator configured to produce hydrogen and an electric flow from a galvanic reaction and a second hydrogen generator configured to produce hydrogen in response to the electric flow.

Embodiments also relate to a method for producing hydrogen from a portable hydrogen generator system. The method includes initiating a galvanic reaction in a first hydrogen generator sufficient to provide an electric flow and a first hydrogen stream, and contacting a second hydrogen generator with the electric flow sufficient to provide a second hydrogen stream.

Embodiments of the present invention relate to a method for producing hydrogen including initiating a galvanic reaction in a first hydrogen generator sufficient to provide an electric flow and a first hydrogen stream, directing the first hydrogen stream to an external device, heating a second hydrogen generator with the electric flow sufficient to provide a second hydrogen stream and directing the second hydrogen stream to the external device.

Embodiments of the present invention also relate to a method for producing hydrogen, including initiating a galvanic reaction in a first hydrogen generator sufficient to provide an electric flow and a first hydrogen stream, directing the first hydrogen stream to a hydrogen storage reservoir, heating a second hydrogen generator with the electric flow sufficient to provide a second hydrogen stream and directing the second hydrogen stream to the hydrogen storage reservoir. The method may further include fluidly coupling the hydrogen storage reservoir to an external device, transferring hydrogen from the hydrogen storage reservoir to the external device, and decoupling the external device.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate to a hybrid, or combined chemistry, hydrogen generation system. The present invention utilizes a galvanic reaction in a first hydrogen generator that produces a hydrogen stream and an electric flow. A second hydrogen generator including a thermally-activated hydrogen generator utilizes the electric flow from the galvanic reaction to produce a second stream of hydrogen. The combination of galvanic chemistry and the thermally-activated release of hydrogen creates a high energy density hydrogen generation system, while minimizing balance-of-plant, or "system" overhead.

The galvanic hydrogen generator, or first hydrogen generator, may be easily controllable, either automatically in response to a signal or stimuli or manually via user input (e.g. an 'on/off' switch). The galvanic reaction may be turned on and off by opening and closing the electrical circuit within the galvanic cell. Closing the electrical circuit within the galvanic cell may provide an electrical pathway for a current between electrodes of the galvanic cell so as to initiate a reaction. Once the reaction is initiated, a first hydrogen stream is produced that may be channeled to the thermally-activated hydrogen generator (second hydrogen generator) or channeled directly to an external device for use as a fuel (e.g. in a fuel cell) or to a reservoir for storage. The first hydrogen stream may be channeled to a reservoir shared by the first and second hydrogen generators. The reservoir may be located within the hydrogen generator system, or may be located external to the system (for example, on board a hydrogen-powered device). The reservoir may store the generated hydrogen as compressed gas, or may store the hydrogen in a second form (for example, the hydrogen may be occluded in a metal hydride or other material capable of reversibly occluding and desorbing hydrogen). The generated hydrogen may be conditioned or processed prior to being transferred to the reservoir from the first hydrogen generator, second hydrogen generator, or both. For example, the hydrogen may be dried, passed over or through a contaminant absorber, filtered, or compressed. Further examples of suitable configuration for storage reservoirs, and ways in which hydrogen may be conditioned or processed may be found in commonly owned U.S. Patent Application Pub. No. 2007/0084879, titled "Hydrogen supplies and related methods", the disclosure of which is herein incorporated in its entirety by reference.

The electric flow, or current, produced by the reaction may be used to provide heat to the thermally-activated hydrogen generator. Rather than spending resources to dissipate the current, this electric flow may be efficiently utilized to heat one or more materials of the second generator and produce a second stream of hydrogen. Further, the electrical circuit may be selectively opened or closed to control heat provided to the thermally-activated hydrogen generator and therefore also control the second stream of hydrogen. The electrical circuit which controls heat provided to the thermally-activated hydrogen generator may be independent from the circuit which enables initiation of the galvanic reaction or may be integrated, such that a single switch may be operable to both initiate the galvanic reaction and direct heat to the second hydrogen generator. The switches may be simple electronic switches, or may be a pressure switch or a thermal switch. This second stream of hydrogen may be directed to an external device for use or channeled to the shared buffer/hydrogen reservoir or storage container prior to being fed to the device, as described above in reference to the first stream of hydrogen. The second stream of hydrogen may further be conditioned or processed as described above. The external device may be a hydrogen powered appliance, such as fuel cell powered electronic devices.

By combining a galvanic hydrogen generator and a thermally-activated hydrogen generator, energy released from the galvanic reaction may be controlled to supply heat consumed by the thermally-activated generator. The need for a controllable heat source may be met by the galvanic generator and therefore the overhead of a second energy source for generating heat may be met with a hydrogen generation system, reducing the need for parasitic balance-of-plant components.

The result of the combined, hybrid hydrogen generation system maximizes hydrogen production, eliminates the need for secondary heating or cooling and maintains an overall controllable (e.g., switchable) generator. Further, in embodiments where the galvanic hydrogen generator includes a galvanic reaction which is net exothermic, the galvanic hydrogen generator may be thermally coupled to the thermally-activated hydrogen generator, to further augment the heat supplied to the thermally-activated hydrogen generator.

In addition, most thermally-activated hydrogen generators do not quickly provide a hydrogen stream. In order to release hydrogen, the temperature of the hydrogen generation material generally needs to rise to a specified temperature, or have a specified quantity of heat input, which may take time and may delay the speed of fueling or refueling an external device. Hydrogen produced from a galvanic reaction may be near spontaneous. As the thermally-activated generator rises to the desired temperature, the galvanic generator may have begun generating hydrogen, which may be supplied to an external device (either directly, or indirectly via a reservoir and/or conditioning process), thus providing a more consistent delivery of hydrogen.

DEFINITIONS

As used herein, "hydrogen generator" refers to a component or components that produce hydrogen when activated by a stimulus. In the present invention, a first hydrogen generator may facilitate a galvanic reaction that produces hydrogen and an electric flow. A second hydrogen generator may produce hydrogen in response to an electric flow from the galvanic reaction or subsequent heat provided. The second hydrogen generator may be a thermally-activated hydrogen generator which includes one or more materials that generate or release hydrogen in response to heat. Such materials may chemically or physically bind hydrogen or may produce hydrogen as a product of a chemical reaction. One or more catalysts may be utilized with such materials to facilitate the generation or release of hydrogen. Examples of hydrogen-binding materials include metal hydrides, suitable zeolites, and carbon-based reversible hydrogen-storing materials such as suitable carbon nanotubes, carbon fibres, carbon aerogels, and activated carbon. Examples of materials that may produce hydrogen as a product of a chemical reaction include chemical hydrides, hydrocarbon hydrogen carriers, and other suitable hydrogen-containing compounds, such as ammonia, amine boranes, alcohols such as methanol and ethanol, and formic acid. Such materials may produce hydrogen via any suitable reactions including without limitation thermolysis, hydrolysis, and electrolysis.

The galvanic hydrogen generator may be configurable, connectable, electrically connectable, thermally connectable, fluidically connectable or a combination thereof to the thermally-activated hydrogen generator. The thermally-activated hydrogen generator may be configurable, connectable, electrically connectable, thermally connectable, fluidically connectable or a combination thereof to the galvanic hydrogen generator.

As used herein, "galvanic" or "galvanic reaction" refers to producing electricity or an electric flow as a result of a chemical reaction. A galvanic reaction may take place between dissimilar metals suspended in an electrolyte. The electrolyte may be any suitable material useful for this purpose, and for example may include an aqueous electrolyte, such as salt water. In addition to an electric flow, hydrogen may be produced. Examples of galvanic reactions are shown in U.S. Pat.

No. 4,436,793 entitled "Control System for Hydrogen Generators," the disclosure of which is herein incorporated by reference.

As used herein, "configured" or "configure" refers to designing, arranging, setting up, or shaping with a view to specific applications, purposes or uses. A hydrogen generator may be set up to produce hydrogen under certain conditions, such as in response to an electric flow or in response to heat, for example.

As used herein, "electric flow" refers to an electric current or a stream of electrons. A galvanic reaction creates an electric flow when initiated and continues to produce such a stream until any reactants are consumed, or the reaction is stopped or interfered with.

As used herein, "dissimilar metals" refers to two or more unlike metals or metal alloys. Dissimilar metals may be used as electrodes, such as anodes and cathodes, in a galvanic reaction. Materials of the anode and cathode electrode may include dissimilar metals including combinations of magnesium, aluminum, manganese, zinc, iron, aluminum, steel, stainless steel, nickel-plated steel, platinum, and alloys thereof. Dissimilar metals may also have dissimilar electrical potentials, such that when electrically connected, a current flows. Standard electrode potentials determine the electrochemical potential of a cell including the galvanic reaction. Some exemplary electrode potentials of electrode materials at 298K, 1 bar pressure and in aqueous solution, of concentration 1 molar in Volts relative to the standard hydrogen electrode are listed below.

| Half-reaction | $E^\theta$ (V) |
| --- | --- |
| $\underline{Li}^+(aq) + e^- \rightarrow Li(s)$ | −3.05 |
| $\underline{Rb}^+(aq) + e^- \rightarrow Rb(s)$ | −2.98 |
| $\underline{K}^+(aq) + e^- \rightarrow K(s)$ | −2.93 |
| $\underline{Cs}^+(aq) + e^- \rightarrow Cs(s)$ | −2.92 |
| $\underline{Ba}^{2+}(aq) + 2e^- \rightarrow Ba(s)$ | −2.91 |
| $\underline{Sr}^{2+}(aq) + 2e^- \rightarrow Sr(s)$ | −2.89 |
| $\underline{Ra}^{2+}(aq) + 2e^- \rightarrow Ra(s)$ | −2.80 |
| $\underline{Ca}^{2+}(aq) + 2e^- \rightarrow Ca(s)$ | −2.76 |
| $\underline{Na}^+(aq) + e^- \rightarrow Na(s)$ | −2.71 |
| $\underline{Mg}^{2+}(aq) + 2e^- \rightarrow Mg(s)$ | −2.38 |
| $H_2 + 2e^- \rightarrow 2H^-$ | −2.25 |
| $\underline{Ac}^{3+}(aq) + 3e^- \rightarrow Ac(s)$ | −2.20 |
| $\underline{Be}^{2+}(aq) + 2e^- \rightarrow Be(s)$ | −1.85 |
| $\underline{Al}^{3+}(aq) + 3e^- \rightarrow Al(s)$ | −1.68 |
| $\underline{Ti}^{2+}(aq) + 2e^- \rightarrow Ti(s)$ | −1.63 |
| $\underline{TiO}(s) + 2H^+ + 2e^- \rightarrow Ti(s) + H_2O$ | −1.31 |
| $Ti_2O_3(s) + 2H^+ + 2e^- \rightarrow 2TiO(s) + H_2O$ | −1.23 |
| $\underline{Ti}^{3+}(aq) + 3e^- \rightarrow Ti(s)$ | −1.21 |
| $\underline{Mn}^{2+}(aq) + 2e^- \rightarrow Mn(s)$ | −1.18 |
| $\underline{V}^{2+}(aq) + 2e^- \rightarrow V(s)$ | −1.13 |
| $\underline{Nb}^{3+}(aq) + 3e^- \rightarrow Nb(s)$ | −1.099 |
| $\underline{Sn}(s) + 4H^+ + 4e^- \rightarrow SnH_4(g)$ | −1.07 |
| $SiO_2(s) + 4H^+ + 4e^- \rightarrow Si(s) + 2H_2O$ | −0.91 |
| $\underline{B(OH)}_3(aq) + 3H^+ + 3e^- \rightarrow B(s) + 3H_2O$ | −0.89 |
| $\underline{TiO}^{2+}(aq) + 2H^+ + 4e^- \rightarrow Ti(s) + H_2O$ | −0.86 |
| $2H_2O(l) + 2e^- \rightarrow H_2(g) + 2 OH^-(aq)$ | −0.83 |
| $\underline{Zn}^{2+}(aq) + 2e^- \rightarrow Zn(s)$ | −0.76 |
| $\underline{Cr}^{3+}(aq) + 3e^- \rightarrow Cr(s)$ | −0.74 |
| $\underline{Au(CN)}_2^-(aq) + e^- \rightarrow Au(s) + 2 CN^-(aq)$ | −0.60 |
| $PbO(s) + H_2O + 2e^- \rightarrow Pb(s) + 2OH^-$ | −0.58 |
| $2TiO_2(s) + 2H^+ + 2e^- \rightarrow Ti_2O_3(s) + H_2O$ | −0.56 |
| $\underline{Ga}^{3+}(aq) + 3e^- \rightarrow Ga(s)$ | −0.53 |
| $H_3PO_2(aq) + H^+ + e^- \rightarrow P(s) + 2H_2O$ | −0.51 |
| $\underline{H_3PO_3}(aq) + 3H^+ + 3e^- \rightarrow P(s) + 3H_2O$ | −0.50 |
| $\underline{H_3PO_3}(aq) + 2H^+ + 2e^- \rightarrow H_3PO_2(aq) + H_2O$ | −0.50 |
| $\underline{Fe}^{2+}(aq) + 2e^- \rightarrow Fe(s)$ | −0.44 |
| $2CO_2(g) + 2H^+(aq) + 2e^- \rightarrow HOOCCOOH(aq)$ | −0.43 |
| $\underline{Cr}^{3+}(aq) + e^- \rightarrow Cr^{2+}(aq)$ | −0.42 |
| $\underline{Cd}^{2+}(aq) + 2e^- \rightarrow Cd(s)$ | −0.40 |
| $PbSO_4(s) + 2e^- \rightarrow Pb(s) + SO_4^{2-}(aq)$ | −0.36 |

-continued

| Half-reaction | $E^\theta$ (V) |
| --- | --- |
| $GeO_2(s) + 2H^+ + 2e^- \rightarrow GeO(s) + H_2O$ | −0.37 |
| $\underline{In}^{3+}(aq) + 3e^- \rightarrow In(s)$ | −0.34 |
| $\underline{Tl}^+(aq) + e^- \rightarrow Tl(s)$ | −0.34 |
| $\underline{Ge}(s) + 4H^+ + 4e^- \rightarrow GeH_4(g)$ | −0.29 |
| $\underline{Co}^{2+}(aq) + 2e \rightarrow Co(s)$ | −0.28 |
| $H_3PO_4(aq) + 2H^+ + 2e^- \rightarrow H_3PO_3(aq) + H_2O$ | −0.28 |
| $\underline{V}^{3+}(aq) + e^- \rightarrow V^{2+}(aq)$ | −0.26 |
| $\underline{Ni}^{2+}(aq) + 2e^- \rightarrow Ni(s)$ | −0.25 |
| $\underline{As}(s) + 3H^+ + 3e^- \rightarrow AsH_3(g)$ | −0.23 |
| $MoO_2(s) + 4H^+ + 4e^- \rightarrow Mo(s) + 2H_2O$ | −0.15 |
| $\underline{Si}(s) + 4H^+ + 4e^- \rightarrow SiH_4(g)$ | −0.14 |
| $Sn^{2+}(aq) + 2e^- \rightarrow Sn(s)$ | −0.13 |
| $O_2(g) + H^+ + e^- \rightarrow HO_2\bullet(aq)$ | −0.13 |
| $\underline{Pb}^{2+}(aq) + 2e^- \rightarrow Pb(s)$ | −0.13 |
| $\underline{WO}_2(s) + 4H^+ + 4e^- \rightarrow W(s) + 2H_2O$ | −0.12 |
| $\underline{CO}_2(g) + 2H^+ + 2e^- \rightarrow HCOOH(aq)$ | −0.11 |
| $\underline{Se}(s) + 2H^+ + 2e^- \rightarrow H_2Se(g)$ | −0.11 |
| $CO_2(g) + 2H^+ + 2e^- \rightarrow CO(g) + H_2O$ | −0.11 |
| $\underline{SnO}(s) + 2H^+ + 2e^- \rightarrow Sn(s) + H_2O$ | −0.10 |
| $SnO_2(s) + 2H^+ + 2e^- \rightarrow SnO(s) + H_2O$ | −0.09 |
| $\underline{WO}_3(aq) + 6H^+ + 6e^- \rightarrow W(s)$ | −0.09 |
| $\underline{P}(s) + 3H^+ + 3e^- \rightarrow PH_3(g)$ | −0.06 |
| $\underline{HCOOH}(aq) + 2H^+ + 2e^- \rightarrow HCHO(aq) + H_2O$ | −0.03 |
| $2H^+(aq) + 2e^- \rightarrow H_2(g)$ | 0.00 |
| $H_2MoO_4(aq) + 6H^+ + 6e^- \rightarrow Mo(s) + 4H_2O$ | +0.11 |
| $\underline{Ge}^{4+}(aq) + 4e^- \rightarrow Ge(s)$ | +0.12 |
| $\underline{C}(s) + 4H^+ + 4e^- \rightarrow CH_4(g)$ | +0.13 |
| $\underline{HCHO}(aq) + 2H^+ + 2e^- \rightarrow CH_3OH(aq)$ | +0.13 |
| $\underline{S}(s) + 2H^+ + 2e^- \rightarrow H_2S(g)$ | +0.14 |
| $Sn^{4+}(aq) + 2e^- \rightarrow Sn^{2+}(aq)$ | +0.15 |
| $\underline{Cu}^{2+}(aq) + e^- \rightarrow Cu^+(aq)$ | +0.16 |
| $HSO_4^-(aq) + 3H^+ + 2e^- \rightarrow 2H_2O(l) + SO_2(aq)$ | +0.16 |
| $SO_4^{2-}(aq) + 4H^+ + 2e^- \rightarrow 2H_2O(l) + SO_2(aq)$ | +0.17 |
| $SbO^+ + 2H^+ + 3e^- \rightarrow Sb(s) + H_2O$ | +0.20 |
| $H_3AsO_3(aq) + 3H^+ + 3e^- \rightarrow As(s) + 3H_2O$ | +0.24 |
| $GeO(s) + 2H^+ + 2e^- \rightarrow Ge(s) + H_2O$ | +0.26 |
| $Re^{3+}(aq) + 3e^- \rightarrow Re(s)$ | +0.300 |
| $Bi^{3+}(aq) + 3e^- \rightarrow Bi(s)$ | +0.32 |
| $VO^{2+}(aq) + 2H^+ + e^- \rightarrow V^{3+}(aq)$ | +0.34 |
| $Cu^{2+}(aq) + 2e^- \rightarrow Cu(s)$ | +0.34 |
| $[Fe(CN)_6]^{3-}(aq) + e^- \rightarrow [Fe(CN)_6]^{4-}(aq)$ | +0.36 |
| $O_2(g) + 2H_2O(l) + 4e^- \rightarrow 4OH^-(aq)$ | +0.40 |
| $H_2MoO_4 + 6H^+ + 3e^- \rightarrow Mo^{3+}(aq)$ | +0.43 |
| $CH_3OH(aq) + 2H^+ + 2e^- \rightarrow CH_4(g) + H_2O$ | +0.50 |
| $SO_2(aq) + 4H^+ + 4e^- \rightarrow S(s) + 2H_2O$ | +0.50 |
| $Cu^+(aq) + e^- \rightarrow Cu(s)$ | +0.52 |
| $CO(g) + 2H^+ + 2e^- \rightarrow C(s) + H_2O$ | +0.52 |
| $I_2(s) + 2e^- \rightarrow 2I^-(aq)$ | +0.54 |
| $\underline{I_3}^-(aq) + 2e^- \rightarrow 3I^-(aq)$ | +0.54 |
| $[AuI_4]^-(aq) + 3e^- \rightarrow Au(s) + 4I^-(aq)$ | +0.56 |
| $H_3AsO_4(aq) + 2H^+ + 2e^- \rightarrow H_3AsO_3(aq) + H_2O$ | +0.56 |
| $[AuI_2]^-(aq) + e^- \rightarrow Au(s) + 2I^-(aq)$ | +0.58 |
| $MnO_4^-(aq) + 2H_2O(l) + 3e^- \rightarrow MnO_2(s) + 4OH^-(aq)$ | +0.59 |
| $S_2O_3^{2-} + 6H^+ + 4e^- \rightarrow 2S(s) + 3H_2O$ | +0.60 |
| $H_2MoO_4(aq) + 2H^+ + 2e^- \rightarrow MoO_2(s) + 2H_2O$ | +0.65 |
| $O_2(g) + 2H^+ + 2e^- \rightarrow H_2O_2(aq)$ | +0.70 |
| $Tl^{3+}(aq) + 3e^- \rightarrow Tl(s)$ | +0.72 |
| $H_2SeO_3(aq) + 4H^+ + 4e^- \rightarrow Se(s) + 3H_2O$ | +0.74 |
| $Fe^{3+}(aq) + e^- \rightarrow Fe^{2+}(aq)$ | +0.77 |
| $Hg_2^{2+}(aq) + 2e^- \rightarrow 2Hg(l)$ | +0.80 |
| $\underline{Ag}^+(aq) + e^- \rightarrow Ag(s)$ | +0.80 |
| $NO_3^-(aq) + 2H^+ + e^- \rightarrow NO_2(g) + H_2O$ | +0.80 |
| $[AuBr_4]^-(aq) + 3e^- \rightarrow Au(s) + 4Br^-(aq)$ | +0.85 |
| $Hg^{2+}(aq) + 2e^- \rightarrow Hg(l)$ | +0.85 |
| $MnO_4^- + H^+ + e^- \rightarrow HMnO_4^-(aq)$ | +0.90 |
| $2Hg^{2+}(aq) + 2e^- \rightarrow Hg_2^{2+}(aq)$ | +0.91 |
| $[AuCl_4]^-(aq) + 3e^- \rightarrow Au(s) + 4Cl^-(aq)$ | +0.93 |
| $MnO_2(s) + 4H^+ + e^- \rightarrow Mn^{3+}(aq) + 2H_2O$ | +0.95 |
| $[AuBr_2]^-(aq) + e^- \rightarrow Au(s) + 2Br^-(aq)$ | +0.96 |
| $Br_2(l) + 2e^- \rightarrow 2Br^-(aq)$ | +1.07 |
| $Br_2(aq) + 2e^- \rightarrow 2Br^-(aq)$ | +1.09 |
| $IO_3^-(aq) + 5H^+ + 4e^- \rightarrow HIO(aq) + 2H_2O$ | +1.13 |
| $[AuCl_2]^-(aq) + e^- \rightarrow Au(s) + 2Cl^-(aq)$ | +1.15 |
| $HSeO_4^-(aq) + 3H^+ + 2e^- \rightarrow H_2SeO_3(aq) + H_2O$ | +1.15 |
| $Ag_2O(s) + 2H^+ + 2e^- \rightarrow 2Ag(s)$ | +1.17 |
| $ClO_3^-(aq) + 2H^+ + e^- \rightarrow ClO_2(g) + H_2O$ | +1.18 |
| $ClO_2(g) + H^+ + e^- \rightarrow HClO_2(aq)$ | +1.19 |
| $2IO_3^-(aq) + 12H^+ + 10e^- \rightarrow I_2(s) + 6H_2O$ | +1.20 |

-continued

| Half-reaction | $E^\theta$ (V) |
|---|---|
| $ClO_4^-(aq) + 2H^+ + 2e^- \rightarrow ClO_3^-(aq) + H_2O$ | +1.20 |
| $O_2(g) + 4H^+ + 4e^- \rightarrow 2H_2O$ | +1.23 |
| $MnO_2(s) + 4H^+ + 2e^- \rightarrow Mn^{2+}(aq) + 2H_2O$ | +1.23 |
| $Tl^{3+}(aq) + 2e^- \rightarrow Tl^+(aq)$ | +1.25 |
| $Cl_2(g) + 2e^- \rightarrow 2Cl^-(aq)$ | +1.36 |
| $Cr_2O_7^{2-}(aq) + 14H^+ + 6e^- \rightarrow 2Cr^{3+}(aq) + 7H_2O$ | +1.36 |
| $CoO_2(s) + 4H^+ + e^- \rightarrow Co^{3+}(aq) + 2H_2O$ | +1.42 |
| $2HIO(aq) + 2H^+ + 2e^- \rightarrow I_2(s) + 2H_2O$ | +1.44 |
| $BrO_3^-(aq) + 5H^+ + 4e^- \rightarrow HBrO(aq) + 2H_2O$ | +1.45 |
| $2BrO_3^- + 12H^+ + 10e^- \rightarrow Br_2(l) + 6H_2O$ | +1.48 |
| $2ClO_3^- + 12H^+ + 10e^- \rightarrow Cl_2(g) + 6H_2O$ | +1.49 |
| $MnO_4^-(aq) + 8H^+ + 5e^- \rightarrow Mn^{2+}(aq) + 4H_2O$ | +1.51 |
| $HO_2^\bullet + H^+ + e^- \rightarrow H_2O_2(aq)$ | +1.51 |
| $Au^{3+}(aq) + 3e^- \rightarrow Au(s)$ | +1.52 |
| $NiO_2(s) + 4H^+ + 2e^- \rightarrow Ni^{2+}(aq)$ | +1.59 |
| $2HClO(aq) + 2H^+ + 2e^- \rightarrow Cl_2(g) + 2H_2O$ | +1.63 |
| $Ag_2O_3(s) + 6H^+ + 4e^- \rightarrow 2Ag^+(aq) + 3H_2O$ | +1.67 |
| $HClO_2(aq) + 2H^+ + 2e^- \rightarrow HClO(aq) + H_2O$ | +1.67 |
| $Pb^{4+}(aq) + 2e^- \rightarrow Pb^{2+}(aq)$ | +1.69 |
| $MnO_4^-(aq) + 4H^+ + 3e^- \rightarrow MnO_2(s) + 2H_2O$ | +1.70 |
| $H_2O_2(aq) + 2H^+ + 2e^- \rightarrow 2H_2O$ | +1.76 |
| $AgO(s) + 2H^+ + e^- \rightarrow Ag^+(aq) + H_2O$ | +1.77 |
| $Au^+(aq) + e^- \rightarrow Au(s)$ | +1.83 |
| $BrO_4^-(aq) + 2H^+ + 2e^- \rightarrow BrO_3^-(aq) + H_2O$ | +1.85 |
| $Co^{3+}(aq) + e^- \rightarrow Co^{2+}(aq)$ | +1.92 |
| $Ag^{2+}(aq) + e^- \rightarrow Ag^+(aq)$ | +1.98 |
| $S_2O_8^{2-} + 2e^- \rightarrow 2SO_4^{2-}$ | +2.07 |
| $HMnO_4^-(aq) + 3H^+ + 2e^- \rightarrow MnO_2(s) + 2H_2O$ | +2.09 |
| $F_2(g) + 2e^- \rightarrow 2F^-(aq)$ | +2.87 |
| $F_2(g) + 2H^+ + 2e^- \rightarrow 2HF(aq)$ | +3.05 |

As used herein, "heating element" refers to a component that gives off heat in response to an electric flow. Examples of heating elements include resistive heating elements and heat pumps.

As used herein, "heat pump" refers to a component that moves heat from one location to another location, such as from a reservoir of lower temperature (e.g., a low temperature heat source) to one of a higher temperature (e.g., a higher temperature heat sink). A heat pump may move heat in response to a current, such as an electric flow.

As used herein, "resistor" refers to a device used to control or modify a current in an electric circuit by providing resistance. A resistor opposes an electric current by producing a voltage drop between terminals. Resistors and/or restive heating elements may be used as a heat source in proximity to a thermally-activated hydrogen generator to initiate release or generation of hydrogen, for example.

As used herein, "switch" refers to a component which can break an electrical circuit, interrupting the current or diverting it from one conductor to another. Any type of switch suitable for the purposes required herein may be used. A simple electrical switch may be used, or a pressure switch or thermal switch may be used, for example. A pressure switch may be a form of switch that makes electrical contact when a certain set pressure has been reached on its input. A thermal switch (sometimes called a thermal reset) may be a device which normally opens at a high temperature and re-closes when the temperature drops.

As used herein, "metal hydride" refers to metal or metal alloy particles that are capable of forming metal hydrides when contacted with hydrogen. Examples of such metal or metal alloys are $LaNi_5$, $FeTi$, $Mg_2Ni$ and $ZrV_2$. Such compounds are representative examples of the more general description of metal hydride compounds: AB, $AB_2$, $A_2B$, $AB_5$ and BCC, respectively. When bound with hydrogen, these compounds form metal hydrides, such as $MgH_2$, $Mg_2NiH_4$, $Mg_2FeH_6$, $FeTiH_2$ and $LaNi_5H_6$, for example. Examples of metals used to form metal hydrides include vanadium, magnesium, lithium, aluminum, calcium, transition metals, lanthanides, and intermetallic compounds and solid solutions thereof. As used herein, "chemical hydride" refers to a substance that decomposes to release hydrogen including simple or complex metal hydride compounds that decompose to produce hydrogen. Simple metal hydrides that decompose to provide hydrogen include without limitation sodium hydride, lithium hydride, calcium hydride, aluminum hydride, and magnesium hydride. Complex metal hydrides that decompose to provide hydrogen include without limitation alkali metal borohydrides, such as magnesium aluminum hydride, sodium borohydride, and lithium aluminum hydride. Note that chemical hydrides, such as lithium aluminum hydride, may decompose to release hydrogen via thermolysis reactions, although chemical hydrides may release hydrogen in response to hydrolysis reactions facilitated in response to heat provided by the galvanic reaction. For example, heat provided by the galvanic reaction may decompose a thermal barrier to facilitate a hydrolysis reaction or any other suitable reaction, as described in U.S. Pat. No. 6,989,210, the disclosure of which is herein incorporated by reference.

As used herein, "hydrocarbon hydrogen carrier" refers to carbon-based liquids or solids that bind hydrogen including saturated hydrocarbons such as cyclohexane and dodecahydron-ethyl carbazole, saturated amino boranes such as cyclotriborazane, carbazoles, and other saturated cyclic hydrocarbons, polycyclic hydrocarbons, aryls, heteroaryls, and acyclic hydrocarbons.

As used herein, "catalyst" refers to a material or substance that assists in starting or increasing the rate of a reaction, without being modified or consumed itself. A catalyst does not allow for a reaction to take place, but it provides an alternative route to products, the catalytic route being subject to lower activation energy than in the uncatalyzed reaction. A lowered activation energy increases the reaction rate. Catalysts generally change in the course of a reaction but are regenerated.

As used herein, "external device" refers to a device that utilizes a hydrogen stream. External devices may be hydrogen powered appliances or hydrogen reservoirs or fuel cell cartridges. External devices may be fuel cells or may be electronic devices powered by fuel cells, for example. External devices may be hydrogen powered electronic devices, such as cellular phones, satellite phones, PDAs, smartphones, laptop computers, computer accessories, ultra mobile computers, displays, personal audio or video players, medical devices, televisions, transmitters, receivers, lighting devices, flashlights or electronic toys. The external device may be a refueler for hydrogen powered electronic devices, for example. The external device may include larger power systems, such as portable power sources up to about 500 W or 1-5 kW, for example.

Referring to FIG. 1, a schematic view 100 of a hybrid hydrogen generation system utilizing a galvanic reaction is shown, according to some embodiments. A first hydrogen generator 102 utilizes a galvanic reaction to produce an electric flow 106 and a first hydrogen stream 104. A second hydrogen generator 108 utilizes the electric flow 106 to produce a second hydrogen stream 110. The second hydrogen stream may be channeled to a storage reservoir 112. The first hydrogen stream 104 may be channeled to the second hydrogen generator. Alternately, the first hydrogen stream may be channeled or transferred to the storage reservoir or directly to an external device (not shown).

The first and second hydrogen generators 102, 108 may be located near enough to each other for efficient channeling of the first hydrogen stream 104 and electric flow 106, but far enough away that when second hydrogen generator 108 utilizes the electric flow 106, such use does not interfere with the operation of the first generator 102. The first and second hydrogen generators 102, 108 may be electrically coupled, thermally coupled, fluidically coupled or combinations thereof. In one example, the second generator 108 may be a high temperature hydrogen generator that uses heat to release hydrogen. In such embodiments, a heat source may be located near the second generator 108, but away from the first generator 102, or the first and second generators may be located proximal to one another, or be otherwise thermally connected, such that heat produced from the first hydrogen generator may be transferred to the second hydrogen generator.

Figure 2:
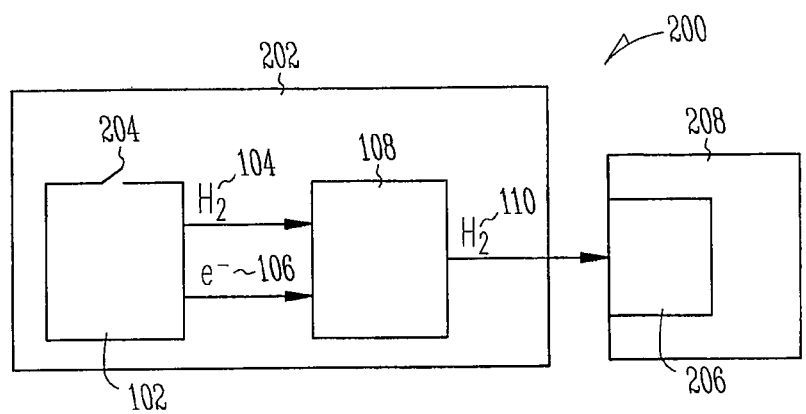
FIG. 2 illustrates a schematic view of a hybrid hydrogen generation system utilizing a switch to control a galvanic reaction, according to some embodiments.

Referring to FIG. 2, a schematic view 200 of a hybrid hydrogen generation system utilizing a switch 204 to control a galvanic reaction, according to some embodiments. The switch 204 may electrically connect two dissimilar metals or alloys thereof, for example, completing an electric circuit and initiating the galvanic reaction. A housing 202 may enclose the hydrogen generation system. A first hydrogen generator 102 utilizes a galvanic reaction that may be controlled either automatically in response to a signal or stimuli, or manually via user input. In particular, a switch 204 may control the opening or closing of an electrical circuit. The galvanic reaction can be turned on and off by opening and closing the electrical circuit within the galvanic cell. The hydrogen may be transferred to an internal reservoir 206 of an external device 208. The electric flow 106 may be controllable via a switch (not shown), such that generation of hydrogen from the second generator 108 may be selectively initiated or discontinued. The switch controlling electric flow 106 may be independent of switch 204, or may be integrated with switch 204, such that closing switch 204 both initiates the galvanic reaction and enables initiation of the second hydrogen generator through completion of a single circuit.

The user control may incorporate any mechanical means, electrical means or a combination thereof to control the opening or closing of the circuit. The user may push a button, flip a manual switch or turn a dial, for example. Control of the galvanic reaction may be governed automatically, such as by a computer program or electrical or mechanical relays. The opening or closing of the electrical circuit may be triggered automatically or in response to user-selected conditions. For example, a sensor may be employed which monitors the electric flow levels, heat output or temperature and sends an electrical or mechanical signal to open the electrical circuit if the measurement rises above or falls below a pre-selected value. In some embodiments the switch may include a sensor, such as a pressure switch or a thermal switch to enable automatic activation or discontinuing of one or both hydrogen generators in response to a pressure or temperature within the system. The switch(es) may be activated in response to a condition in the first hydrogen generator 102, the second hydrogen generator 108, the storage reservoir 112, the external device 208, or combinations thereof.

Figure 3:
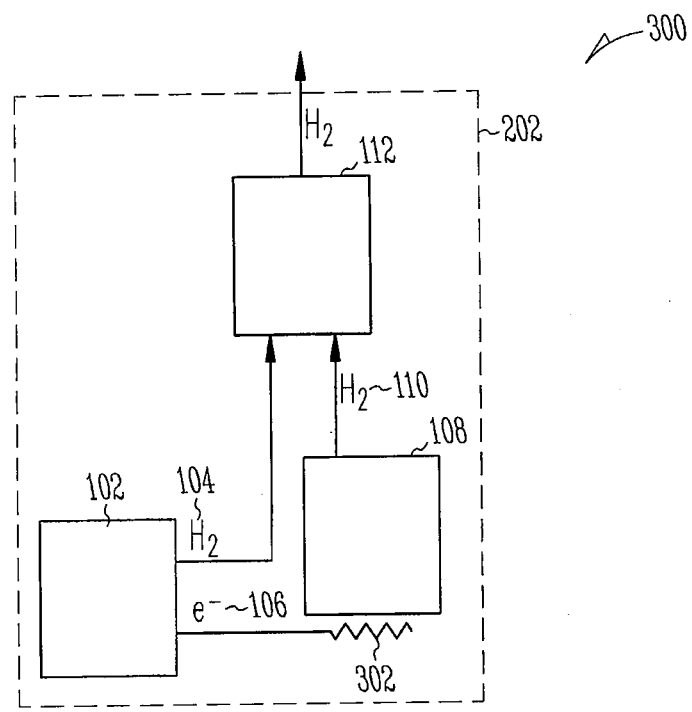
FIG. 3 illustrates a schematic view of a hybrid hydrogen generation system utilizing a resistive heat source, according to some embodiments.

Referring to FIG. 3, a schematic view 300 of a hybrid hydrogen generation system utilizing a resistive heat source is shown, according to some embodiments. A first hydrogen generator 102 utilizes a galvanic reaction and may produce a first stream of hydrogen 104. The first stream of hydrogen 104 may be channeled directly to an external device (not shown), channeled to the external device via an optional storage reservoir 112 or stored intermediately in the storage reservoir 112 until such time as it is required. The hydrogen flow from the storage reservoir may be controlled by any suitable means, such as a valve (not shown). For example, the valve may be actuated by connecting an external device to the valve by way of a suitable coupling mechanism. Examples of such coupling mechanisms can be found in commonly owned U.S. Patent Application Pub. No. 2008/0143098, titled "Magnetic fluid coupling assemblies and methods", the disclosure of which is herein incorporated in its entirety by reference. The electric flow 106 produced may be used to create a heat source 302, such as by using a resistor in proximity to the second hydrogen generator 108. The second hydrogen stream 110 then produced may, similar to the first hydrogen stream, be channeled directly to the external device (not shown) for use, channeled to the external device via an optional storage reservoir 112, or stored intermediately in the optional storage reservoir 112 until such time as it is required. The first hydrogen generator 102, the second hydrogen generator 108, and the optional internal reservoir 112 may optionally be contained in a housing 202.

The system may optionally contain a control system or feedback mechanism to control the generation of hydrogen. Hydrogen generation may be initiated in response to coupling of an external device to the system, for example, or discontinued in response to decoupling of the external device. Alternately, hydrogen generation may be initiated in response to the quantity of hydrogen in the storage reservoir falling below a first, or lower, threshold level, and may be discontinued in response to the quantity of hydrogen in the storage reservoir exceeding a second, or upper, threshold level.

Figure 4:
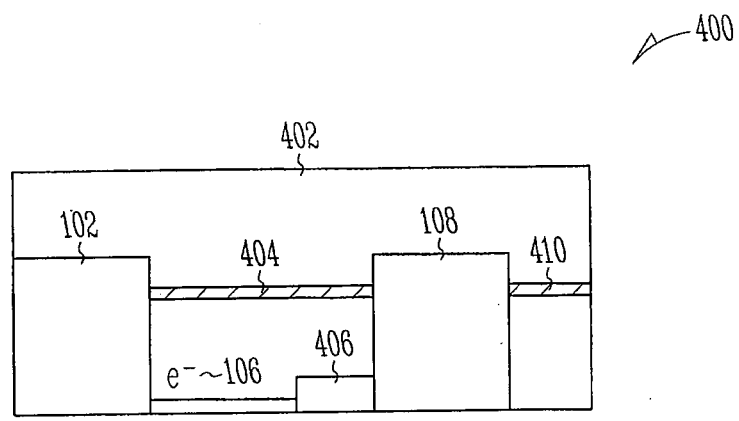
FIG. 4 illustrates a schematic view of a hybrid hydrogen generation system utilizing a heat pump, according to some embodiments.

Referring to FIG. 4, a schematic view 400 of a hybrid hydrogen generation system utilizing a heat pump is shown, according to some embodiments. An external device 402 may enclose or be configured to couple to a hybrid hydrogen generation system. A first hydrogen generator 102 utilizing a galvanic reaction produces a first hydrogen stream which may be channeled by a first conduit 404 to a second hydrogen generator 108, or to a storage reservoir (not shown) or an external device (not shown). The electric flow 106 generated from the galvanic reaction may be directed to a heat source 406, such as a heat pump. The heat pump may be located near the second hydrogen generator 108 and may be used to initiate release of hydrogen from a thermally-activated hydrogen storage material, creating a second hydrogen stream in a second conduit 410. In some embodiments, for example if the galvanic reaction is net exothermic, heat generated from the first hydrogen generator 102 may be directed to the second hydrogen generator 108, either via a thermal conduit (not shown) or a heat pump (e.g. 406). In such embodiments, the electric flow 106 may be directed to the same heat source as heat generated from the first hydrogen generator 102, or may be channeled to an independent heat source, such as a resistive heat source or a second heat pump. The second conduit 410 may then direct hydrogen to the external device 402 for use or to a storage reservoir (not shown) for storage. Conduits may be utilized to direct hydrogen streams to internal or external reservoirs as well. Conduits may include any type of conduit commonly known in the art for directing the flow of hydrogen, including but not limited to tubing (e.g. PTFE or FEP tubing), piping (e.g. aluminum or low-carbon steel piping), or other types of fluidic manifolds, such as those described in commonly-owned U.S. Patent Application Pub. No. 2008/0311458, titled "Fluid manifold and method therefor", the disclosure of which is herein incorporated by reference in its entirety.

It should be understood that in all embodiments described herein, the hydrogen generation system may either be a stand-alone device, such as a hydrogen refueling station, enclosed in a housing (202), or may be incorporated directly into an external device (e.g. 208, 402), such as a fuel cell-powered portable electronic device, or combinations thereof. In cases where the system is a stand-alone device, it may be adapted to be removably couplable to an external device.

Figure 5:
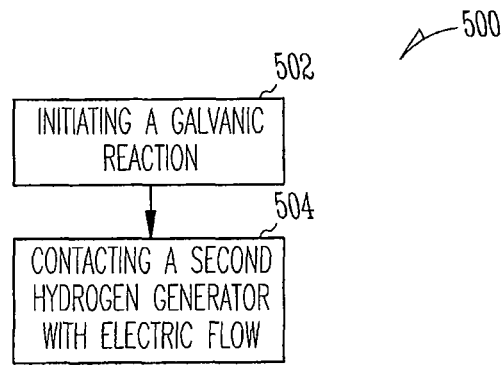
FIG. 5 illustrates a block flow diagram of a method of using a hybrid hydrogen generation system, according to some embodiments.

Referring to FIG. 5, a block flow diagram 500 of a method of using a hybrid hydrogen generation system is shown, according to some embodiments. A galvanic reaction may be initiated 502 in a first hydrogen generator, sufficient to provide an electric flow and a first hydrogen stream. A second hydrogen generator may be contacted 504 with the electric flow, sufficient to provide a second hydrogen stream. The first and second hydrogen streams may be directed independently or together to an external device or hydrogen powered appliance (e.g. fuel cell powered electronic device) for use. Alternately, the first and second hydrogen streams may be directed to a hydrogen storage reservoir, either within the hydrogen generating system, or on-board an external device.

The galvanic reaction may be initiated 502 when the electrical circuit is closed. The circuit may be closed by any mechanical means, electrical means or a combination thereof. The reaction may be initiated by user input or without the action of a user, such as by a timer or computer program when user-directed or manufacturer-set conditions are met, or by a switch which responds automatically in response to a predetermined set of conditions, for example. In some embodiments, the circuit may be closed in response to coupling an external device to the hydrogen generator system, or in response to a quantity of hydrogen in a hydrogen storage reservoir falling below a certain threshold level or in response to a pressure or temperature falling below a specified value or changing more than a specified amount. Initiation 502 may occur in response to a quantity of hydrogen in an internal reservoir falling below a first threshold level. Initiation 502 may also occur in response to a coupling with an external device.

The second hydrogen generator may be contacted 504 with an electric flow to produce a second hydrogen stream. The contacting 504 may include heating. Heating may include directing the electric flow through a resistor or to a heat pump, for example.

In addition, the hydrogen generation may be stopped automatically in response to a certain condition or on user input or direction. Hydrogen generation may be stopped in response to a quantity of hydrogen in an internal reservoir exceeding a second threshold level or in response to a decoupling of an external device from the system or in response to a pressure or temperature exceeding a specified value or changing more than a specified amount.

Figure 6:
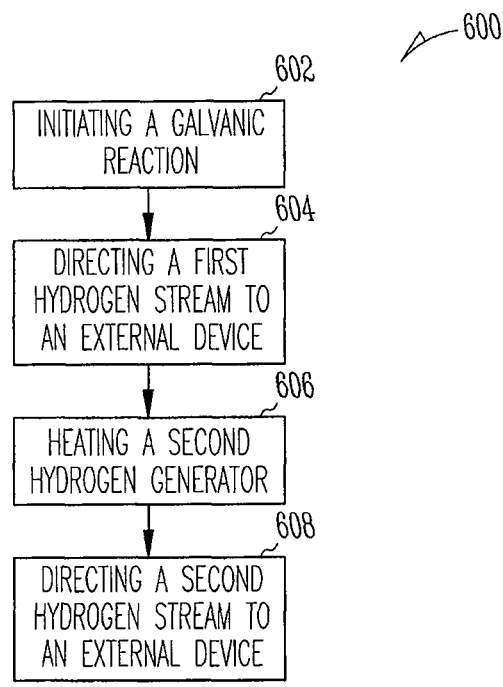
FIG. 6 illustrates a block flow diagram of a method of using a hybrid hydrogen generation system, according to some embodiments.

Referring to FIG. 6, a block flow diagram 600 of a method of using a hybrid hydrogen generation system is shown, according to some embodiments. A galvanic reaction may be initiated 602 in a first hydrogen generator, sufficient to provide an electric flow and a first hydrogen stream. The first hydrogen stream may be directed 604 to an external device while a second hydrogen generator may be heated 606 by contacting with the electric flow and provide a second hydrogen stream. The second hydrogen stream may be directed 608 to the external device once hydrogen is released or generated from hydrogen-containing material in the second hydrogen generator, for example in response to heating 606 the second hydrogen generator.

Figure 7:
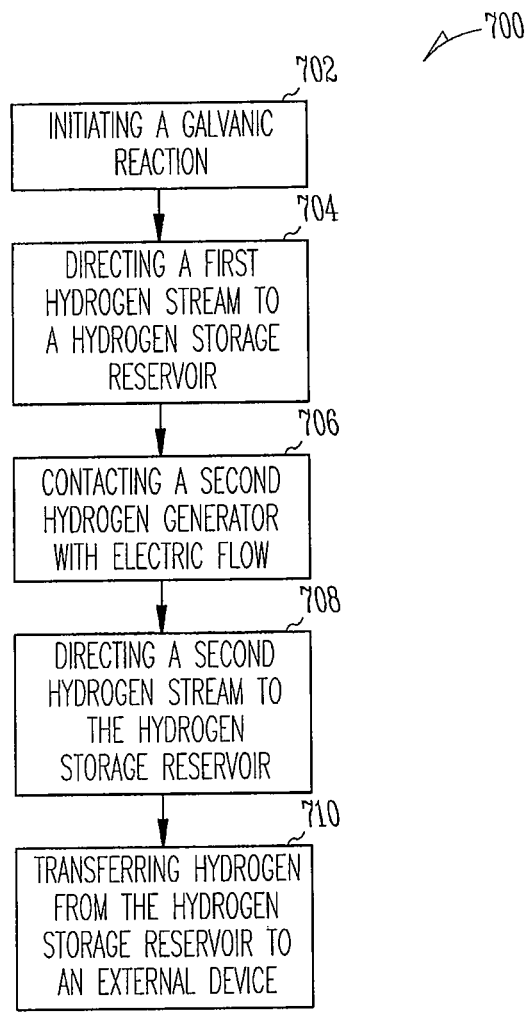
FIG. 7 illustrates a block flow diagram of a method of using a hybrid hydrogen generation system, according to some embodiments.

Referring to FIG. 7, a block flow diagram 700 of a method of using a hybrid hydrogen generation system is shown, according to some embodiments. A galvanic reaction may be initiated 702 in a first hydrogen generator, sufficient to provide an electric flow and a first hydrogen stream. The first hydrogen stream may be directed 704 to a hydrogen storage reservoir, either directly or via an optional conditioning step, while an electric flow may be transferred from the first hydrogen generator and contacted 706 with the second hydrogen generator. The second hydrogen generator may then provide a second hydrogen stream in response to the electric flow (or a stimulus invoked by the electric flow, such as heating), and the second hydrogen stream may be directed 708 to the hydrogen storage reservoir, either directly or via an optional conditioning step. The hydrogen in the hydrogen storage reservoir may then be transferred 710 to an external device, for example in response to an external device being suitably coupled to the reservoir or hybrid hydrogen generating system.

In some embodiments, the first hydrogen stream may be directed to the external device while the electric flow may be directed to provide heating to the second hydrogen generator. In doing this, the first hydrogen stream may provide hydrogen to the external device while the second hydrogen generator may be heated.

Although embodiments of the present invention describe an apparatus or hydrogen generating system, individual components of the apparatus or system are believed to be patentable. Embodiments of the present invention include such individual components, including the first and second hydrogen generators.

The above description is intended to be illustrative, and not restrictive. For example, the above-described examples may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

What is claimed is:

1. A method for producing hydrogen from a portable hydrogen generator system, comprising:
   initiating a galvanic reaction in a first hydrogen generator, sufficient to provide an electric flow and a first hydrogen stream, wherein the electric flow is produced directly by the galvanic reaction; and
   heating a second hydrogen generator with the electric flow from the first hydrogen generator, sufficient to provide a second hydrogen stream, wherein the second hydrogen generator is thermally-activated.

2. The method of claim 1, wherein initiating comprises closing an electrical circuit.

3. The method of claim 1, further comprising transferring the first and second hydrogen streams to an internal reservoir.

4. The method of claim 1, further comprising transferring the hydrogen streams to an external device.

5. The method of claim 4, wherein transferring the hydrogen streams to an external device comprises:
   fluidly coupling an external device to the system;
   transferring hydrogen from the system to the external device; and
   decoupling the external device from the system.

6. The method of claim 1, further comprising after initiating, directing the first hydrogen stream to an external device.

7. The method of claim 1, wherein initiating occurs in response to a quantity of hydrogen in an internal reservoir falling below a first threshold level.

8. The method of claim 1, wherein initiating occurs in response to coupling an external device to the system.

9. The method of claim 1, further comprising stopping hydrogen generation.

10. The method of claim 9, wherein stopping hydrogen generation happens in response to a quantity of hydrogen in an internal reservoir exceeding a second threshold level or in response to decoupling an external device from the system.

11. A method for producing hydrogen, comprising:
   initiating a galvanic reaction in a first hydrogen generator, sufficient to provide an electric flow and a first hydrogen stream, wherein the electric flow is produced directly by the galvanic reaction, and the galvanic reaction is exothermic;
   directing the first hydrogen stream to an external device;
   heating a second hydrogen generator with the electric flow from the first hydrogen generator and with heat from the exothermic galvanic reaction, sufficient to provide a second hydrogen stream, wherein the second hydrogen generator is thermally-activated;
   controlling an amount of hydrogen in the second hydrogen stream by controlling the galvanic reaction in the first hydrogen generator; and
   directing the second hydrogen stream to the external device.

12. The method of claim 1, wherein the first hydrogen generator includes two dissimilar metals in contact with an electrolyte.

13. The method of claim 12, further including a switch configured to electrically connect the two dissimilar metals.

14. The method of claim 1, wherein the first and second hydrogen streams are directed into a hydrogen storage reservoir, and wherein the hydrogen storage reservoir and both the first and second hydrogen generators are enclosed together within a single device.

15. The method of claim 11, wherein the first hydrogen generator includes two dissimilar metals in contact with an electrolyte.

16. The method of claim 15, further including a switch configured to electrically connect the two dissimilar metals.

17. The method of claim 11, wherein the first and second hydrogen streams are directed into a hydrogen storage reservoir before being directed to the external device, and wherein the hydrogen storage reservoir and both the first and second hydrogen generators are enclosed together within a single device.

18. The method of claim 1 further comprising: controlling an amount of hydrogen in the second hydrogen stream by controlling the galvanic reaction in the first hydrogen generator.

19. A method for producing hydrogen from a hybrid hydrogen generation system, comprising:
   initiating an exothermic galvanic reaction in a first hydrogen generator, sufficient to provide a first hydrogen stream, electric flow, and heat; and
   supplying a first heat source and a second heat source to a second hydrogen generator, resulting in a second hydrogen stream, wherein the second hydrogen generator is thermally-activated, the first heat source is the heat from the first hydrogen generator, and the second heat source uses electric flow from the first hydrogen generator.

20. The method of claim 19, further comprising transferring the first and second hydrogen streams to at least one of an internal reservoir and an external device.

21. The method of claim 19, further comprising controlling a quantity of hydrogen in the first and second hydrogen streams.

22. The method of claim 21, wherein controlling the quantity of the hydrogen in the first and second hydrogen streams is a function of monitoring a level of hydrogen in an internal reservoir.

* * * * *